United States Patent Office 3,644,300
Patented Feb. 22, 1972

3,644,300
CROSSLINKING OF PERFLUOROALKYLENE
TRIAZINE POLYMER
Edwin Dorfman and William E. Emerson, Grand Island, N.Y., assignors to Hooker Chemical Corporation, Niagara Falls, N.Y.
No Drawing. Continuation-in-part of application Ser. No. 634,878, May 1, 1967. This application Apr. 14, 1969, Ser. No. 816,103
Int. Cl. C08f 15/06; C08g 33/02
U.S. Cl. 260—78.4 N                    12 Claims

ABSTRACT OF THE DISCLOSURE

This invention is directed to the crosslinking of polymers containing at least one fluoroalkylene triazine unit typically of the formula:

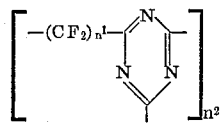

in which $n^1$ is at least 4 up to about 20, $n^2$ is at least 1. However, the invention is also directed to any alkylene-triazine polymer having at least one fluorine substituent on the carbon adjacent to the triazine ring. Polymers of the general type of these polymers described above include the polymers of the copending application, Ser. No. 533,430, filed Mar. 11, 1966, for example. The cross-linking agent of this invention is selected from the group consisting of amidines and imidines, preferably halogenated alkyl imidines and amidines, a preferred embodiment being a perfluoroalkylene such as perfluoroglutarimidine. Representative amidines typically include perfluorosuberamidine and perfluorosebacamidine. The characteristic structure of the imidine of this invention is typically represented by the following formula:

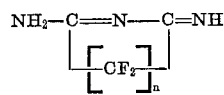

in which $n$ is from 1 to 3.

REFERENCE TO PRIOR APPLICATION

This is a continuation-in-part of application Ser. No. 634,878, filed May 1, 1967, now abandoned.

SUMMARY

This invention is directed to a novel process of crosslinking fluoroalkylenetriazine polymers having at least one fluorine substituent on a carbon adjacent to a triazine ring, by the employment of a particular crosslinking agent, and also is directed to the novel crosslinked reaction product thereof. Accordingly, the invention relates to the crosslinking of elastomeric polymers to obtain a dielectric product that will withstand very high temperatures.

BACKGROUND

Recent advances in rocket and guided missile ordnance have made necessary elastomeric, dielectric material that will withstand the ultra-high temperatures resulting from aerodynamic heating and energy conversion processes associated with high-speed flight, where the operational temperature extremes are beyond the capabilities of many of the currently available materials. Elastomers in use today as high-temperature dielectrics, such as the silicones, and particular copolymers such as chlorotrifluoroethylene-vinylidene fluoride and vinylidene fluoride-hexafluoropropylene, for example, are not considered suitable for use at temperatures much above 250 degrees centigrade, yet the need for elastomers that will withstand temperatures well above 250 degrees centigrade has been increasing.

Accordingly, an object of the invention is a process for crosslinking elastomeric polymers that will have desired high temperature performance, and dielectric characteristics.

Another object is to provide an elastomeric dielectric compound that will withstand the high temperatures encountered in high-speed space flights, which will be relatively inexpensive to manufacture, and to provide a relatively simple, practical and inexpensive method for producing such a dielectric compound.

Another object of this invention is a novel process of crosslinking fluoroalkylenetriazine polymers by the novel use of a critical crosslinking agent.

Other objects become apparent from the above and following disclosure.

DESCRIPTION

The objections of this invention are obtained by a process of curing a triazine polymer or copolymer free of amidine groups, with a crosslinking member at a temperature sufficiently elevated to crosslink said triazine polymer or copolymer, said triazine polymer or copolymer being characterized by at least one fluorine substituent on a carbon atom adjacent to a triazine ring, and said crosslinking member being selected from the group consisting of ammonia, an ammonium salt of a weak acid, an imidine, an amine, a non-polymeric amidine, substituted forms thereof and mixtures thereof, in which said triazine polymer or copolymer comprises an alkylene triazine polymer characterized by the formula:

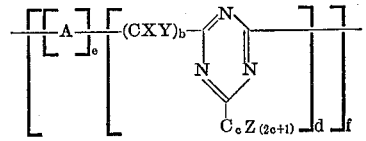

in which $b$ is at least 4 to about 60, $c$ is at least 1 to about 30, $d$ is at least one to about 500,000, $e$ is 0 or 1 to about 500,000, and $f$ is at least 2 to about 20, in which X, Y and Z are each selected from the group consisting of halogen, alkyl, and aryl, and in which A is a monomer unit. The halogen substituent may be fluorine, chlorine, iodine or bromine, but preferably is fluorine. Typical monomer units include perhaloalkylene, haloalkylene, nitrosohaloalkyl, oxaperfluoroalkylene, dioxaperfluoroalkylene, trioxaperfluoroalkylene, m-carboranylene, diallylsiloxy and combinations thereof such as tetrafluorethylene, nitrosotrifluoromethane, dioxaperfluoroalkylene, vinylene fluoride and the like.

The process includes crosslinking of a fluoroalkylenetriazine polymer having at least one fluorine substituent on a carbon adjacent to a triazine ring by a reaction with the aforesaid crosslinking agent and substituted forms thereof in which the substituent is selected from the group consisting of hydrogen, alkyl, aryl and substituted forms of said alkyl and said aryl, for a period of time sufficiently long and at a temperature sufficiently high to crosslink and to thereby obtain the novel crosslinked product of this invention. In general, a time of about thirty minutes to about 18 hours or more is employed, preferably about 1 to about 5 hours. The temperature generally is about 50 to about 250 degrees centigrade, preferably about 125 to about 175 degrees centigrade.

The imidine crosslinking agent of this invention, is characterized by the representative formula as follows:

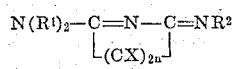

in which $R^1$ and $R^2$ are each selected from the group consisting of hydrogen, alkyl, aryl and substituted forms of said alkyl and said aryl, in which X is selected from the group consisting of fluorine, chlorine, iodine, bromine, mixtures thereof, and alkyl substituents such as methyl, butyl, propyl, ethyl, pentyl, hexyl, decyl and the like and in which $n$ is from 1 to 4. Typical imidines include perfluoroglutarimidine, perfluoroadipimidine, perfluorosuccinimidine and the like. Perfluoroglutarimidine and perfluoroadipimidine are preferred imidines.

It is also within the scope of this invention to employ polymers such as described in copending Ser. No. 533,148 having the linear imidine group.

A representative structural formula of the amidines employed in this invention is as follows:

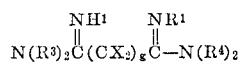

in which $R^3$ and $R^4$ are each selected from the member of $R^1$ and $R^2$, and in which X is fluorine, chlorine, bromine and iodine and mixtures thereof, and $g$ is 1 or 4 to about 30. Representative amidines include perfluoroadipamidine, perfluoromalonamidine, perfluorosuberamidine and the like.

Typical amines within the scope of this invention for employment as crosslinking agents include monoamines and also diamines represented by the formula:

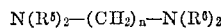

in which $R^5$ and $R^6$ are each selected from the members of $R^1$ and $R^2$ defined above, and $n$ is at least 1. Typical monoamines include butylamine, octylamine, laurylamine, stearylamine, dibutylamine, tributylamine and the like. Representative diamines are ethylenediamine, propylenediamine, tetramethylenediamine, diethyltetraethylenediamine, tetraethylethylenediamine and the like.

Typical weak acids of which the ammonium salts are employed as crosslinking member include organic acids of 1 to 10 carbon atoms such as acetic, propionic, butyric, valeric, and the like, and inorganic acids, such as water, carbonic acid, boric acid, and the like.

The amidines and imidines are the preferred crosslinking agents of this invention.

As described above, the polymers which may be crosslinked by the process of this invention include typically alkylenetriazine polymers which contain at least one fluorine-substituted carbon next to the triazine ring, in the polymer. Included in polymers of this type are those polymers for example described in copending U.S. application Ser. No. 533,430, filed Mar. 11, 1966.

Accordingly, the disclosure of Ser. No. 533,430 is hereby incorporated by reference as illustrative of additional polymers falling within the scope of polymeric reactants of this present invention.

Typically included are those triazine polymers which include a cyano group on the molecule, an aspect of this invention being the presence of at least one fluorine substituent on a carbon next to the triazine ring and it being immaterial that additionally there may or may not be one or more cyano substituents attached to the polymer molecule.

Preferred triazine polymers include
poly(perfluoromethylperfluorohexamethylene-1,3,5-triazine),
poly(perfluoropropylperfluorohexamethylene-1,3,5-triazine),
poly(perfluoroheptylperfluorohexamethylene-1,3,5-triazine),
poly(perfluoromethylcyanopentafluoropropylperfluorohexamethylene-1,3,5-triazine),
poly(perfluoromethylperfluorooctamethylene-1,3,5-triazine),
poly(perfluoropropylperfluorooctamethylene-1,3,5-triazine),
poly(perfluoroheptylperfluorooctamethylene-1,3,5-triazine),
poly(perfluoromethylcyanopentafluoropropylperfluoroheptamethylene-1,3,5-triazine).

In the process of this invention the triazine polymer is mixed sufficiently with a crosslinking agent of this invention for reaction to take place at a temperature sufficiently elevated to initiate reaction. The crosslinking agent will generally comprise about 0.25 to about 10 weight percent of the mixture based on the total weight of the mixture, preferably about 2 to about 6 weight percent. A particular advantage of the process of this invention is the low temperature permissible to successfully initiate and complete a crosslinking reaction. For example, a crosslinking temperature of 100° C. is satisfactory when crosslinking poly-(perfluoropropylperfluorohexamethylene - 1,3,5-triazine) by reaction with a crosslinking agent perfluoroglutarimidine.

A particular advantage of this invention is the very high degree of crosslinking of the polymer achieved by this process.

The mechanism of this invention is not fully understood. For example, although it is believed that the reactions involved are represented as follows, it is altogether possible that the crosslinking agent also acts as a catalyst.

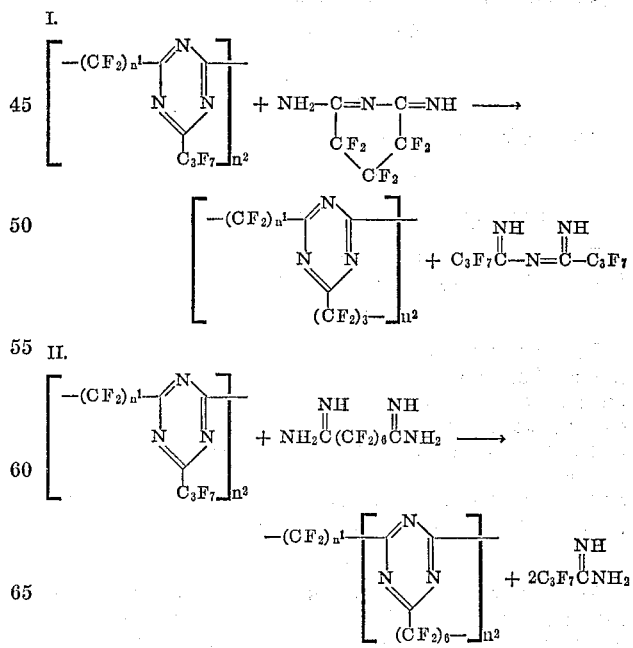

in which $n^1$ typically is 6 and $n^2$ is representative of a number sufficiently large to provide a polymeric compound.

The following examples are illustrative of the above-described process of this invention, but are not intended to limit the scope of this invention. All parts are by weight and temperature is in degrees centigrade unless otherwise specifically stated.

Example 1

To poly(perfluoropropylperfluorohexamethylene-1,3,5-triazine) prepared by the method of Ser. No. 533,430, of intrinsic viscosity 0.24 deciliters per gram, 2.505 grams, was added perfluoroglutarimidine, 0.0592 g.; with mixing on a rubber mill. The mixture was then molded at 150 degrees centigrade to give an insoluble crosslinked polymer.

Example 2

To 100 parts of poly(perfluorohexamethylenetrifluoromethyl-1,3,5-triazine) is added 5 parts of perfluoroadipamidine with mixing on a rubber mill. The mixture is then molded at 170 degrees centigrade to give an insoluble crosslinked polymer.

Example 3

To 100 parts of poly(perfluorooctamethyleneperfluoropropyl-1,3,5-triazine) is added 5 parts of aqueous ammonium hydroxide with mixing on a rubber mill. The mixture is then molded at 130 degrees centigrade to give an insoluble crosslinked polymer.

Example 4

To 100 parts of poly(perfluorooctamethylenetrifluoromethyl-1,3,5-triazine) is added 5 parts of tributylamine with mixing on a rubber mill. The mixture is then molded at 150 degrees centigrade to give an insoluble crosslinked polymer.

The crosslinked products will generally have tensile strengths of about 300 to about 3,000 pounds per square inch and elongations of about 100 to about 600 percent. The crosslinked products are useful as sealents, wire insulation, fabric coatings, O-rings, potting compounds and the like.

The above examples and the above preceding disclosure are intended to descibe the heat of the invention. However, the above disclosure and examples are not intended to unduly limit the scope of this invention, it being apparent that it is within the scope of this invention to make those modifications and employ substituents and equivalents as would be obivous to the skilled artisan.

What is claimed is:

1. A process comprising curing a triazine homopolymer or copolymer free of amidine groups, with a crosslinking agent at a temperature sufficiently elevated to crosslink said triazine homopolymer or copolymer;
   said triazine homopolymer or copolymer having at least one fluorine substituent on a carbon atom adjacent to a triazine ring and by having the formula:

$$\left[\left[A\right]_e\left[(CXY)_b\underset{N}{\underset{\|}{\overset{N}{\overset{\|}{\bigcirc}}}}\underset{C_cZ_{(2c+1)}}{N}\right]_d\right]_f$$

wherein $b$ is 4 to about 60, $c$ is 1 to about 30, $d$ is 1 to about 500,000, $e$ is 0 or 1 to about 500,000, $f$ is 2 to about 20, X, Y and Z are each selected from the group consisting of halogen, alkyl and aryl, and wherein A is a monomer unit selected from the group consisting of perhaloalkylene, haloalkylene, nitrosohaloalkyl, oxaperfluoroalkylene, dioxaperfluoroalkylene, trioxaperfluoroalkylene, m-carboranylene and diallylsiloxy; and said crosslinking agent being selected from at least one of ammonia, an ammonium salt of a weak acid selected from an inorganic acid and an organic acid of 1 to 10 carbon atoms, an imidine of the formula $$N(R^1)_2 - C = N - C = NR^2 \atop \underset{n}{\underbrace{\phantom{xxx}(CX)_2\phantom{xxx}}}$$

wherein $R^1$ and $R^2$ are each selected from the group consisting of hydrogen, alkyl and aryl, wherein X is selected from the group consisting of fluorine, chlorine, iodine, bromine, mixtures thereof, and alkyl of 1 to 10 and wherein $n$ is from 1 to 4, a monoamine, a diamine of the formula $$N(R^5)_2-(CH_2)_n-N(R^6)_2$$

in which $R^5$ and $R^6$ are each selected from the members of $R^1$ and $R^2$ defined above, and $n$ is at least 1, and an amidine of the formula:

$$N(R^3)_2\overset{NR^1}{\overset{\|}{C}}(CX_2)_g\overset{NR^2}{\overset{\|}{C}}-N(R^4)_2$$

in which $R^1$, $R^2$, $R^3$ and $R^4$ are each selected from the group consisting of hydrogen, alkyl, substituted alkyl, aryl, and substituted aryl, in which X is selected from the group consisting of halogen, alkyl, and aryl, and in which $g$ is 1 or 4 to about 30.

2. A process according to claim 1, in which said halogen is selected from the group consisting of fluorine, chlorine, bromine and iodine.

3. A process according to claim 2 in which said halogen is fluorine.

4. A process according to claim 3, in which said triazine homopolymer is selected from the group consisting of
poly(perfluoromethylperfluorohexamethylene-1,3,5-triazine),
poly(perfluoropropylperfluorohexamethylene-1,3,5-triazine),
poly(perfluoroheptylperfluorohexamethylene-1,3,5-triazine),
poly(perfluoromethylcyanopentafluoropropylperfluorohexamethylene-1,3,5-triazine),
poly(perfluoromethylperfluoromethylene1,3,5-triazine),
poly(perfluoropropylperfluorooctamethylene-1,3,5-triazine),
poly(perfluoroheptylperfluorooctamethylene-1,3,5-triazine), and
poly(perfluoromethylcyanopentafluoropropylperfluoroheptamethylene-1,3,5-triazine).

5. A process according to claim 4, in which said crosslinking agent comprises perfluoroglutarimidine.

6. A process according to claim 5, in which said curing temperature is less than about 250 degrees centigrade.

7. A process to claim 1, in which said imidine comprises perfluoroglutarimidine.

8. A process according to claim 1 in which said triazine homopolymer or copolymer includes at least one nitrile substituent.

9. A composition comprising a mixture of (1) a triazine homopolymer or copolymer free of amidine groups, said triazine homopolymer or copolymer having at least one fluorine substituent on a carbon atom adjacent to a triazine ring and by having the formula:

$$\left[\left[A\right]_e\left[(CXY)_b\underset{N}{\underset{\|}{\overset{N}{\overset{\|}{\bigcirc}}}}\underset{C_cZ_{(2c+1)}}{N}\right]_d\right]_f$$

wherein $b$ is 4 to about 60, $c$ is 1 to about 30, $d$ is 1 to about 500,000, $e$ is 0 or 1 to about 500,000, $f$ is 2 to about 20, X, Y and Z are each selected from the group consisting of halogen, alkyl and aryl, and wherein A is monomeric unit selected from the group consisting of perhaloalkylene, haloalkylene, nitrosohaloalkyl, oxaperfluoroalkylene, dioxaperfluoroalkylene, trioxaperfluoroalkylene, m-carboranylene and diallylsiloxy; and (2) a crosslinking agent selected from at least one of ammonia, an ammonium salt of a weak acid selected from an inorganic acid and an organic acid of 1 to 10 carbon atoms, an imidine of the formula

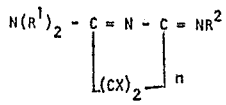

wherein $R^1$ and $R^2$ are each selected from the group consisting of hydrogen, alkyl and aryl, wherein X is selected from the group consisting of fluorine, chlorine, iodine, bromine, mixtures thereof, and alkyl of 1 to 10 and wherein $n$ is from 1 to 4, a monoamine, a diamine of the formula

in which $R^5$ and $R^6$ are each selected from the members of $R^1$ and $R^2$ defined above, and $n$ is at least 1, and an amidine of the formula

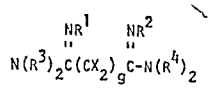

in which $R^1$, $R^2$, $R^3$ and $R^4$ are each selected from the group consisting of hydrogen, alkyl, substituted alkyl, aryl, and substituted aryl, in which X is selected from the group consisting of halogen, alkyl, and aryl, and in which $g$ is 1 or 4 to about 30.

10. The composition of claim 9 where said triazine polymer is selected from the group consisting of poly(perfluoromethylperfluorohexamethylene-1,3,5-triazine),
poly(perfluoropropylperfluorohexamethylene-1,3,5-triazine),
poly(perfluoroheptylperfluorohexamethylene-1,3,5-triazine),
poly(perfluoromethylcyanopentafluoropropylperfluorohexamethylene-1,3,5-triazine),
poly(perfluoromethylperfluorooctamethylene-1,3,5-triazine),
poly(perfluoropropylperfluorooctamethylene-1,3,5-triazine),
poly(perfluoroheptylperfluorooctamethylene-1,3,5-triazine), and
poly(perfluoromethylcyanopentafluoropropylperfluoroheptamethylene-1,3,5-triazine).

11. The composition of claim 10 wherein said crosslinking agent is an imidine.
12. The composition of claim 11 wherein said imidine is perfluoroglutarimidine.

References Cited
UNITED STATES PATENTS

| | | | |
|---|---|---|---|
| 3,086,946 | 4/1963 | Brown | 260—2 |
| 3,218,270 | 11/1965 | Delman | 260—2 |
| 3,317,484 | 5/1967 | Fritz | 260—78.4 |
| 3,453,275 | 7/1969 | Grindahl | 260—248 |

JOSEPH L. SCHOFER, Primary Examiner

C. A. HENDERSON, JR., Assistant Examiner

U.S. Cl. X.R.

8—115.6; 117—121, 128.4; 260—2 R, 2 S, 78.4 R, 80 P, 87.5 A, 87.7, 88.3 R, 91.5, 92.1